(12) United States Patent
Torigoe et al.

(10) Patent No.: US 10,947,615 B2
(45) Date of Patent: Mar. 16, 2021

(54) THERMAL BARRIER COATING FILM, TURBINE MEMBER, AND THERMAL BARRIER COATING METHOD

(71) Applicant: MITSUBISHI HEAVY INDUSTRIES, LTD., Tokyo (JP)

(72) Inventors: Taiji Torigoe, Tokyo (JP); Yoshifumi Okajima, Tokyo (JP); Daisuke Kudo, Tokyo (JP); Hiroyuki Mitsui, Tokyo (JP); Masahiko Mega, Tokyo (JP); Shuji Tanigawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 43 days.

(21) Appl. No.: 16/311,324

(22) PCT Filed: Sep. 13, 2017

(86) PCT No.: PCT/JP2017/033050
§ 371 (c)(1),
(2) Date: Dec. 19, 2018

(87) PCT Pub. No.: WO2018/066330
PCT Pub. Date: Apr. 12, 2018

(65) Prior Publication Data
US 2019/0233929 A1    Aug. 1, 2019

(30) Foreign Application Priority Data

Oct. 6, 2016  (JP) ............................. JP2016-198332

(51) Int. Cl.
*C23C 4/11*     (2016.01)
*C23C 4/04*     (2006.01)
(Continued)

(52) U.S. Cl.
CPC ................ *C23C 4/11* (2016.01); *C23C 4/04* (2013.01); *C23C 4/073* (2016.01); *F01D 5/28* (2013.01);
(Continued)

(58) Field of Classification Search
CPC .............. C23C 4/11; C23C 4/073; F01D 5/14
See application file for complete search history.

(56) References Cited

U.S. PATENT DOCUMENTS 5,362,712 A * 11/1994 Preisler ................... C04B 35/45
                                                                505/410
7,758,968 B2 * 7/2010 Schmitz .............. C23C 28/3215
                                                                420/103
(Continued)

FOREIGN PATENT DOCUMENTS

CN    1768969    5/2006
CN    101405423  4/2009
(Continued)

OTHER PUBLICATIONS

Abdullah Cahit Karaoglanli, Thermal Shock and Cycling Behavior of Thermal Barrier Coatings (TBCs) Used in Gas Turbines, 2014, pp. 1-24 (Year: 2014).*

(Continued)

*Primary Examiner* — Maria V Ewald
*Assistant Examiner* — Tong Guo
(74) *Attorney, Agent, or Firm* — Wenderoth, Lind & Ponack, L.L.P.

(57) ABSTRACT

A thermal barrier coating film includes a bond coat layer that is a metallic bond layer formed on a base material; a topcoat layer that is a ceramic-containing layer formed on the bond coat layer; and at least one of a protective layer and a protective substance. The protective layer is formed on the topcoat layer and mainly contains $SrSO_4$. The protective (Continued)

substance is provided in a plurality of void spaces included in the topcoat layer and mainly contains $SrSO_4$.

10 Claims, 5 Drawing Sheets

(51) Int. Cl.
    *F02C 7/00*         (2006.01)
    *F01D 5/28*         (2006.01)
    *F01D 9/02*         (2006.01)
    *C23C 4/073*       (2016.01)
    *F01L 5/14*         (2006.01)

(52) U.S. Cl.
    CPC ................ *F01D 9/02* (2013.01); *F01L 5/14* (2013.01); *F02C 7/00* (2013.01)

(56) References Cited

U.S. PATENT DOCUMENTS

| | | | |
|---|---|---|---|
| 2005/0003172 A1* | 1/2005 | Wheeler | F01D 11/122 428/210 |
| 2009/0176059 A1 | 7/2009 | Namba et al. | |
| 2010/0018278 A1* | 1/2010 | Trojer | B21D 39/031 72/352 |
| 2013/0065076 A1 | 3/2013 | Everhart | |
| 2015/0024302 A1* | 1/2015 | Kobayashi | H01M 4/9033 429/489 |
| 2015/0031272 A1* | 1/2015 | Fulton | F04D 29/164 451/28 |
| 2015/0266273 A1* | 9/2015 | Izumi | C04B 41/5036 428/336 |
| 2016/0084102 A1* | 3/2016 | Pabla | F01D 11/122 415/173.4 |

FOREIGN PATENT DOCUMENTS

| | | |
|---|---|---|
| CN | 103481025 | 1/2014 |
| JP | 2013-60661 | 4/2013 |

OTHER PUBLICATIONS

T. Chandra, High-Temperature Tribological Properties of Barite-TypeSulfate-Coated Substrates with Dierent Isoelectric Points, 2007, 1200-1205 (Year: 2007).*

International Search Report dated Oct. 31, 2017 in International (PCT) Application No. PCT/JP2017/033050.

Office Action dated Aug. 3, 2020 in Chinese Application No. 201780042572.8 with English translation.

* cited by examiner

THERMAL BARRIER COATING FILM, TURBINE MEMBER, AND THERMAL BARRIER COATING METHOD

FIELD

The present invention relates to a thermal barrier coating film, a turbine member, and a thermal barrier coating method.

BACKGROUND

A gas turbine includes a compressor, a combustor, and a turbine. A power generator connected to the turbine is driven in the following manner: air taken in from an air intake is turned into compressed air having a high temperature and a high pressure by being compressed by the compressor; this compressed air is then combusted at the combustor with fuel injected into this air, so that high-temperature and high-pressure combustion gas (working fluid) is obtained; and the turbine is driven by this combustion gas. For this gas turbine, a combustion temperature in the combustor is set high in order for the gas turbine to achieve high efficiency, and the blades and vanes of the turbine, which are exposed to high-temperature combustion gas (exhaust gas), have thermal barrier coating (TBC) films disposed on surfaces thereof. A thermal barrier coating film is obtained by forming a thermal spray material on a surface of a turbine blade or the like by thermal spraying, the thermal spray material having low thermal conductivity (for example, a ceramic-based material having low thermal conductivity). Japanese Patent Publication No. 2013-60661 discloses a gas turbine engine member having such a thermal barrier coating film layered thereon.

SUMMARY

Technical Problem

Recent years have seen an increasing demand for gas turbines that can be driven by liquid fuel, such as heavy oil, other than gas. An oil-driven gas turbine that uses liquid fuel such as heavy oil is possibly exposed to sulfate such as sodium sulfate generated from elements contained in the liquid fuel. This sulfate may penetrate into a thermal barrier coating film and cause the thermal barrier coating film to separate. As a result of the separation of the thermal barrier coating film, the base material of the turbine member is exposed to a high temperature, and there arises the risk of shortening the life of the turbine member.

Therefore, an object of the present invention is to provide a thermal barrier coating film, a turbine member, and a thermal barrier coating method that prevent the separation in a sulfate-containing environment.

Solution to Problem

To solve the problem described above and achieve the object, a thermal barrier coating film according to the present disclosure includes a bond coat layer that is a metallic bond layer formed on a base material; a topcoat layer that is a ceramic-containing layer formed on the bond coat layer; and a protective layer formed on the topcoat layer and mainly containing $SrSO_4$.

$SrSO_4$ contained in a protective layer enables this thermal barrier coating film to prevent sulfate such as sodium sulfate from penetrating into a topcoat layer. The thermal barrier coating film is thus capable of preventing itself from separating from a base material in a sulfate-containing environment.

In the thermal barrier coating film, the topcoat layer preferably has a plurality of void spaces. This thermal barrier coating film is capable of not only exhibiting improved thermal barrier performance owing to void spaces in the topcoat layer but also favorably preventing, owing to the protective layer, sulfate from penetrating from the void spaces in the topcoat layer.

In the thermal barrier coating film, the topcoat layer is preferably a dense vertically cracked coat layer. This thermal barrier coating film is capable of not only preventing, owing to the protective layer, sulfate from penetrating but also exhibiting improved heat cycle durability and improved erosion resistance owing to the topcoat layer that is a dense vertically cracked coat layer.

In the thermal barrier coating film, the protective layer preferably has a porosity of 0.1% to 5%. This thermal barrier coating film has the protective layer provided with low porosity, thereby being capable of more suitably preventing sulfate from penetrating.

To solve the problem described above and achieve the object, a thermal barrier coating film according to the present disclosure includes a bond coat layer that is a metallic bond layer formed on a base material; and a topcoat layer that is a ceramic-containing layer formed on the bond coat layer and having a plurality of void spaces. The topcoat layer has a protective substance in the interior of the void spaces, the protective substance mainly containing $SrSO_4$.

This thermal barrier coating film has a protective substance in the void spaces that constitute paths through which sulfate such as sodium sulfate penetrates. Thus, $SrSO_4$ contained in the protective substance enables this thermal barrier coating film to prevent sulfate from penetrating inward. The thermal barrier coating film is thus capable of preventing sulfate from penetrating into the topcoat layer and consequently preventing itself from separating from the base material in a sulfate-containing environment.

In the thermal barrier coating film, it is preferable that the topcoat layer is a dense vertically cracked coat layer and has the protective substance in the interior of cracks in the dense vertically cracked coat layer. By having a protective substance disposed in cracks that constitute paths through which sulfate penetrates, this thermal barrier coating film prevents sulfate from penetrating into the topcoat layer. This thermal barrier coating film is capable of not only preventing, owing to the protective substance, sulfate from penetrating but also exhibiting improved heat cycle durability and improved erosion resistance owing to the topcoat layer that is a dense vertically cracked coat layer.

To solve the problem described above and achieve the object, a turbine member according to the present disclosure includes the thermal barrier coating film on a surface thereof. This turbine member has the thermal barrier coating film disposed on a surface thereof, thereby being capable of preventing sulfate from penetrating into the topcoat layer and consequently preventing the thermal barrier coating film from separating in a sulfate-containing environment.

To solve the problem described above and achieve the object, a thermal barrier coating method according to the present disclosure includes a bond coat layer forming step of forming, on a base material, a bond coat layer that is a metallic bond layer; a topcoat layer forming step of forming, on the bond coat layer, a topcoat layer that is a ceramic-containing layer; and a protective layer forming step of forming, on the topcoat layer, a protective layer that mainly contains $SrSO_4$. This thermal barrier coating method includes forming the protective layer, thereby being capable of preventing the topcoat layer from separating in a sulfate-containing environment.

To solve the problem described above and achieve the object, a thermal barrier coating method according to the present disclosure includes a bond coat layer forming step of forming, on a base material, a bond coat layer that is a metallic bond layer; a topcoat layer forming step of forming, on the bond coat layer, a topcoat layer that is a ceramic-containing layer having a plurality of void spaces; and a protective substance injecting step of injecting, in the interior of the void spaces in the topcoat layer, a protective substance that mainly contains $SrSO_4$. This thermal barrier coating method includes injecting the protective substance into the topcoat layer, thereby being capable of preventing the topcoat layer from separating in a sulfate-containing environment.

Advantageous Effects of Invention

According to the present invention, separation of a thermal barrier coating film can be prevented in a sulfate-containing environment.

DESCRIPTION OF EMBODIMENTS

The following describes preferred embodiments of the present invention in detail with reference to the accompanying drawings. These embodiments are not intended to limit the present invention, and, when two or more embodiments are given, a combination of examples shall constitute an embodiment.

First Embodiment

Figure 1:
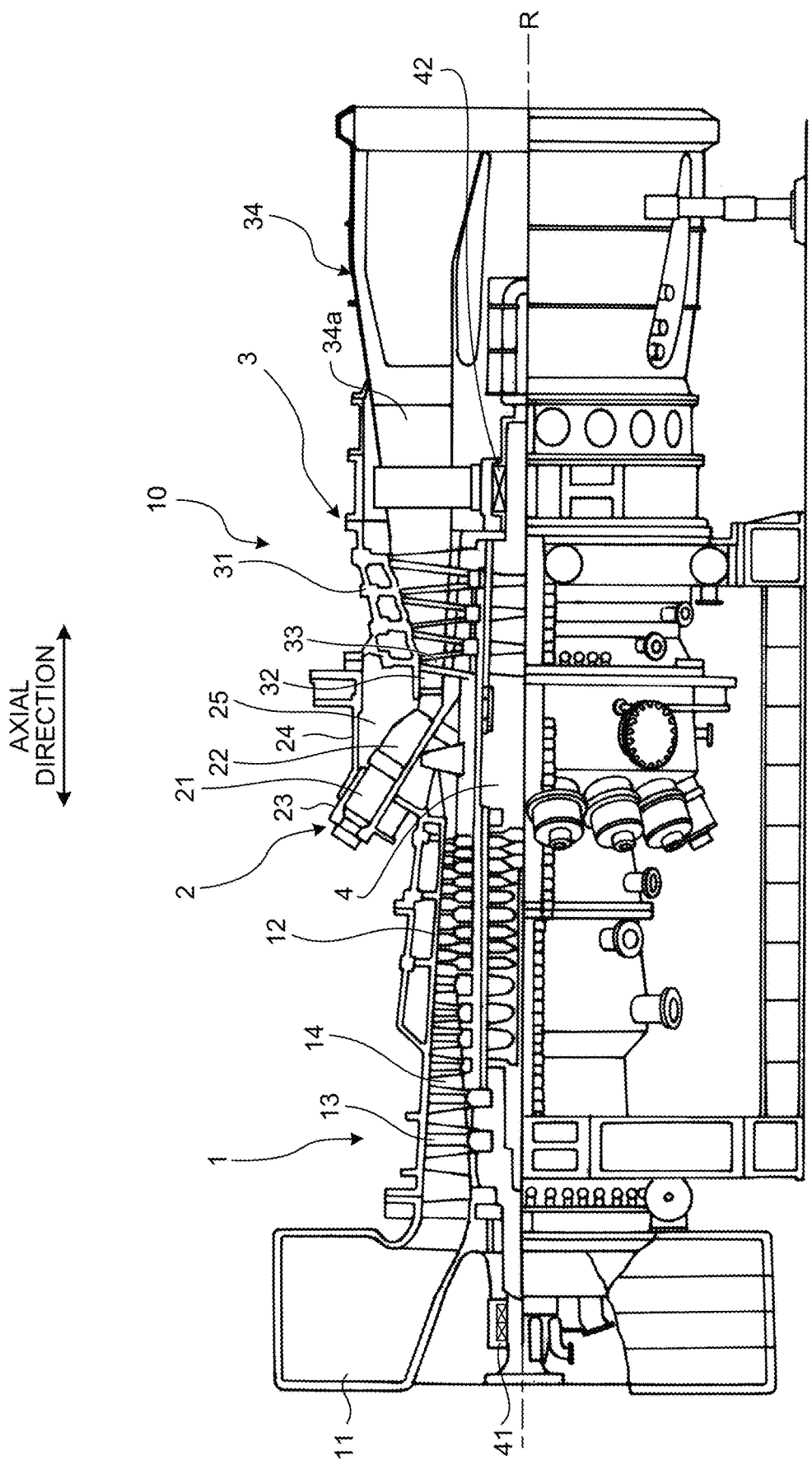
FIG. 1 is a schematic configuration diagram of a gas turbine according to a first embodiment.

FIG. 1 is a schematic configuration diagram of a gas turbine according to a first embodiment. In the first embodiment, while a gas turbine 10 for industry illustrated in FIG. 1 is described as an example, applicable gas turbines include a gas turbine for aviation.

As illustrated in FIG. 1, the gas turbine 10 includes a compressor 1, combustors 2, and a turbine 3. The gas turbine 10 includes a turbine shaft 4, which is a rotary shaft, arranged in and penetrating respective center portions of the compressor 1, the combustors 2, and the turbine 3. The compressor 1, the combustors 2, and the turbine 3 extend along a shaft center R of the turbine shaft 4 and are arranged in a row from the upstream side to the downstream side of flow of air. In the following description, an axial direction refers to a direction parallel to the shaft center R, a circumferential direction refers to a circular direction centered at the shaft center R, and a radial direction refers to a direction perpendicular to the shaft center R.

The compressor 1 is configured to compress air to produce compressed air. The compressor 1 has compressor vanes 13 and compressor blades 14 disposed inside a compressor casing 12 having an air intake 11 through which air is taken in. The multiple compressor vanes 13 are disposed in the circumferential direction and in a row while being attached to the compressor casing 12. The multiple compressor blades 14 are disposed in circumferential direction and in a row while being attached to the turbine shaft 4. These compressor vanes 13 and compressor blades 14 are alternately disposed in the axial direction.

The combustors 2 introduce fuel into the compressed air obtained by compressing air in the compressor 1 and generates high-temperature and high-pressure combustion gas. The combustors 2 each include an inner cylinder 21 serving as a combustion chamber in which compressed air and fuel are mixed and combusted; a transition piece 22 that guides combustion gas from the inner cylinder 21 to the turbine 3; and an external cylinder 23 covering the outer circumference of the inner cylinder 21 and forming an air passage 25 that guides compressed air from the compressor 1 to the inner cylinder 21. The multiple (for example, 16) combustors 2 are disposed to a combustor casing 24 in a row in the circumferential direction. Fuel to be fed into the combustors 2 is gas or liquid fuel such as heavy oil.

The turbine 3 generates rotational power using combustion gas obtained through combustion in the combustors 2. The turbine 3 has turbine vanes 32 and turbine blades 33 disposed inside a turbine casing 31. The multiple turbine vanes 32 are disposed in the circumferential direction and in a row while being attached to the turbine casing 31. The multiple turbine blades 33 are disposed in the circumferential direction and in a row while being attached to the turbine shaft 4. These turbine vanes 32 and turbine blades 33 are alternately disposed in the axial direction. In addition, an exhaust gas chamber 34 continuing into the turbine 3 and including an exhaust gas diffuser 34a is disposed in the rear of the turbine casing 31.

One end of the turbine shaft 4 on the compressor 1 side is supported by a bearing part 41 and the other end thereof on the exhaust gas chamber 34 side is supported by a bearing part 42. The turbine shaft 4 is thus disposed so as to be rotatable about the shaft center R. Furthermore, a drive shaft of a power generator, which is not illustrated, is coupled to the one end of the turbine shaft 4 on the compressor 1 side.

The gas turbine 10 thus configured causes air taken in through the air intake 11 of the compressor 1 to turn into high-temperature and high-pressure compressed air by passing by the multiple compressor vanes 13 and the multiple compressor blades 14 and thereby being compressed. This compressed air is combusted with fuel mixed therewith in the combustor 2, so that high-temperature and high-pressure combustion gas is generated. This combustion gas then passes by the turbine vanes 32 and the turbine blades 33 of the turbine 3 to rotationally drive the turbine shaft 4, and rotational power is consequently imparted to the power generator coupled to this turbine shaft 4, whereby power is generated. Exhaust gas produced as a result of rotationally driving the turbine shaft 4 is vented to atmosphere via the exhaust gas diffuser 34a of the exhaust gas chamber 34.

Figure 2:
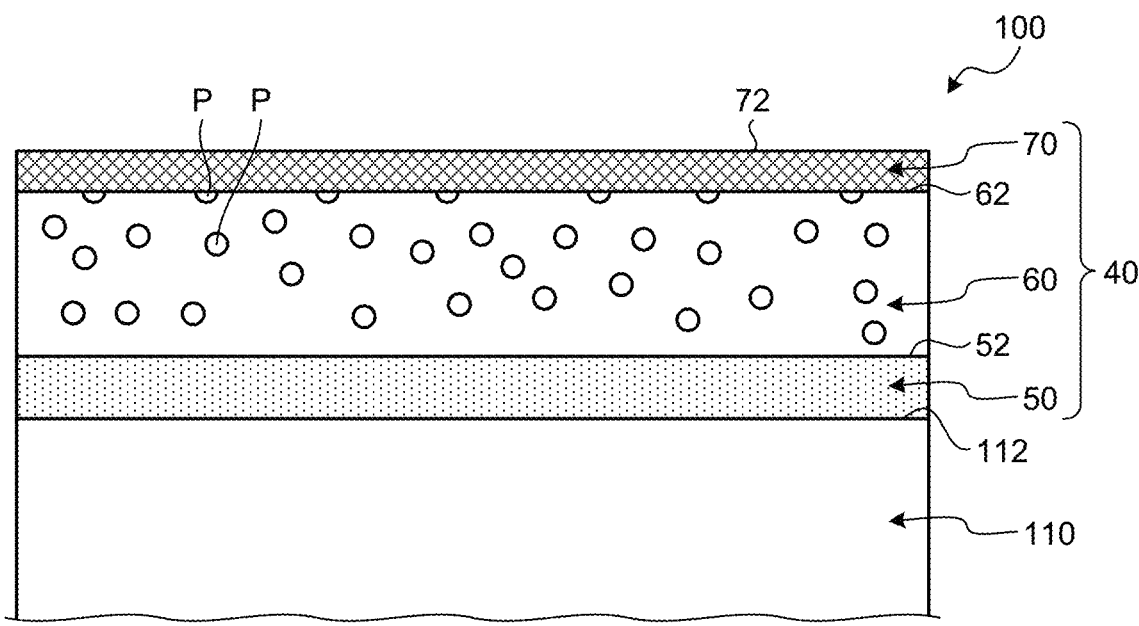
FIG. 2 is a schematic sectional view of a thermal barrier coating film according to the first embodiment.

FIG. 2 is a schematic sectional view of a thermal barrier coating film according to the first embodiment. A thermal barrier coating film 40 according to the first embodiment is disposed on a surface of a turbine member 100, which is a member of the gas turbine 10. The turbine member 100 is a member that is exposed to a high temperature among the members of the gas turbine 10, and is exemplified by a turbine blade and a turbine vane. Specifically, as illustrated in FIG. 2, the thermal barrier coating film 40 is applied to a surface 112 of a base material 110 of the turbine member 100.

As illustrated in FIG. 2, the thermal barrier coating film 40 includes a bond coat layer 50, a topcoat layer 60, and a protective layer 70.

The bond coat layer 50 is formed (layered) on the base material 110, that is, on the surface 112 of the base material 110. The bond coat layer 50 is a metallic bond layer formed of MCrAlY alloy or the like. Here, M stands for a metal element such as Co, Ni, CoNi, or NiC. The bond coat layer 50 has a thickness of, for example, 50 μm to 300 μm. However, the thickness is not limited thereto and may be set as desired. The bond coat layer 50 is layered so as to prevent separation between the base material 110 and the topcoat layer 60 and to improve corrosion resistance and oxidation resistance.

The bond coat layer 50 is formed as a film on the surface 112 of the base material 110 by thermal spraying, more specifically, low pressure plasma spraying (LPPS) with particles of the MCrAlY alloy or the like used as a thermal spray material. However, a method to be used for forming the bond coat layer 50 as a film is not limited to LPPS. For example, the bond coat layer 50 may be formed as a film on the surface 112 through another thermal spraying process such as high velocity oxygen fuel spraying (HVOF) or atmospheric plasma spraying (APS). Alternatively, the bond coat layer 50 may be formed as a film through a vapor deposition process such as electron beam-physical vapor deposition (EB-PVD).

For the bond coat layer 50, LPPS is applied, for example, on the thermal spraying conditions presented in the following Table 1. However, the thermal spraying conditions are not limited thereto and may be set as desired.

TABLE 1

| Condition item | Category | Cleaning | Pre-heating | thermal spraying |
|---|---|---|---|---|
| Chamber | (mbar) | 30 to 40 | 45 to 55 | 55 to 65 |
| Spray distance | (mm) | 250 to 275 | 290 to 320 | 270 to 280 |
| Ar flow volume | (l/min) | 50 to 60 | 45 to 55 | 40 to 50 |
| $H_2$ flow volume | (l/min) | 0 | 7 to 9 | 8 to 10 |
| Current | (Amp) | 490 to 510 | 590 to 610 | 670 to 700 |
| Voltage | (V) | 58 to 62 | 60 to 65 | 62 to 67 |
| Powder feed | (%) | — | — | 12 to 16 |
| Transfer current | (A) | 45 to 55 | — | — |
| Carrier gas flow volume | (l/min) | — | 1.8 to 2.0 | 1.8 to 2.0 |

The topcoat layer 60 is formed (layered) on the bond coat layer 50, that is, on a surface 52 of the bond coat layer 50. The surface 52 is a surface of the bond coat layer 50 that faces away from the base material 110. The topcoat layer 60 is a layer mainly containing ceramic. More specifically, the topcoat layer 60 is formed of a partially stabilized zirconia-based material. As the partially stabilized zirconia-based material, yttria-stabilized zirconia (YSZ), ytterbia-stabilized zirconia (YbSZ), erbia partially stabilized zirconia (ErSZ), or the like is used. Alternatively, the topcoat layer 60 may be formed of a pyrochlore-based material such as $SmZr_2O_7$ or $SmYbZr_2O_7$ that has low thermal conductivity. The topcoat layer 60 is preferably thicker than the bond coat layer 50 and preferably has a thickness of 50 μm to 3000 μm. However, the thickness of the topcoat layer 60 is not limited thereto and may be set as desired.

The topcoat layer 60 has a plurality of void spaces inside, which are a plurality of pores P herein. The pores P include open pores connected to (communicating with) outside air and closed pores not communicating with outside air. The example illustrated in FIG. 2 has none of the bores P communicating with each other; however, the topcoat layer 60 has at least some of the pores P therein communicating with each other. The porosity (% by volume) of the topcoat layer 60 is 1% to 30% by volume, and is more preferably 10% to 15% by volume. However, the porosity of the topcoat layer 60 is not limited thereto.

The topcoat layer 60 is formed as a film on the surface 52 of the bond coat layer 50 by thermal spraying, more specifically, APS with particles of the partially stabilized zirconia-based material used as a thermal spray material. However, the process for forming the topcoat layer 60 as a film is not limited thereto. For example, the topcoat layer 60 may be formed as a film by another thermal spraying process such as LPPS or HVOF. Alternatively, the topcoat layer 60 may be formed as a film through a vapor deposition process such as EB-PVD.

As an example of the film formation condition for the topcoat layer 60, LPPS is adopted for thermal spraying on the bond coat layer 50 (the percent composition by mass of elements contained in the bond coat layer 50 is as follows: Ni at 32%, Cr at 21%, Al at 8%, Y at 0.5%, and Co accounting for the rest by mass) having a film thickness of 100 μm. In this example, a thermal spray gun (F4 gun) manufactured by Sulzer Metco is used for the thermal spraying. The thermal spraying conditions in this example are: current for thermal spraying at 600 A; a spray distance at 150 mm; a powder feed at 60 g/min; Ar and $H_2$ volumes at 35 and 7.4 l/min; and a film thickness at 0.5 mm. However, the thermal spraying conditions (the film forming condition) are not limited thereto and may be set as desired.

The protective layer 70 is formed (layered) on the topcoat layer 60, that is, on a surface 62 of the topcoat layer 60. The surface 62 is a surface of the topcoat layer 60 that faces away from the bond coat layer 50. The protective layer 70 covers the entire area of the surface 62 of the topcoat layer 60. A surface 72 of the protective layer 70 is exposed to the outermost surface of the turbine member 100. The protective layer 70 is a layer formed of $SrSO_4$ (strontium sulfate). However, any layer mainly containing $SrSO_4$ may be used as the protective layer 70 regardless of whether the layer contains another element or other elements.

The protective layer 70 preferably has a smaller thickness than the topcoat layer 60 and preferably has a thickness of 0.05 μm to 200 μm. However, the thickness of the protective layer 70 may be set as desired. Furthermore, the protective layer 70 has a plurality of pores and preferably has a porosity (% by volume) of 0.1% to 15% by volume. To be more specific, the protective layer 70 preferably has a smaller porosity than the topcoat layer 60 and preferably has a porosity of 0.1% to 5% by volume.

The protective layer 70 is formed as a film on the surface 62 of the topcoat layer 60 by thermal spraying, more specifically, APS with $SrSO_4$ particles used as a thermal spray material. However, the process for forming the protective layer 70 as a film is not limited thereto. For example, the protective layer 70 may be formed as a film by another thermal spraying process such as LPPS or HVOF. Alternatively, the protective layer 70 may be formed as a film through a vapor deposition process such as EB-PVD.

For the protective layer 70, preferable thermal spraying conditions are: current for thermal spraying at 650 A to 700 A; a spray distance at 50 mm to 100 mm; a $SrSO_4$ powder feed at 60 g/min; an Ar flow volume at 35 l/min; and a $H_2$ flow volume at 8 l/min to 8.6 l/min. Here, the spray distance is a distance between a nozzle that feeds $SrSO_4$ and a subject to which thermal spraying is applied. However, the thermal spraying conditions are not limited thereto and may be set as desired.

Figure 3:
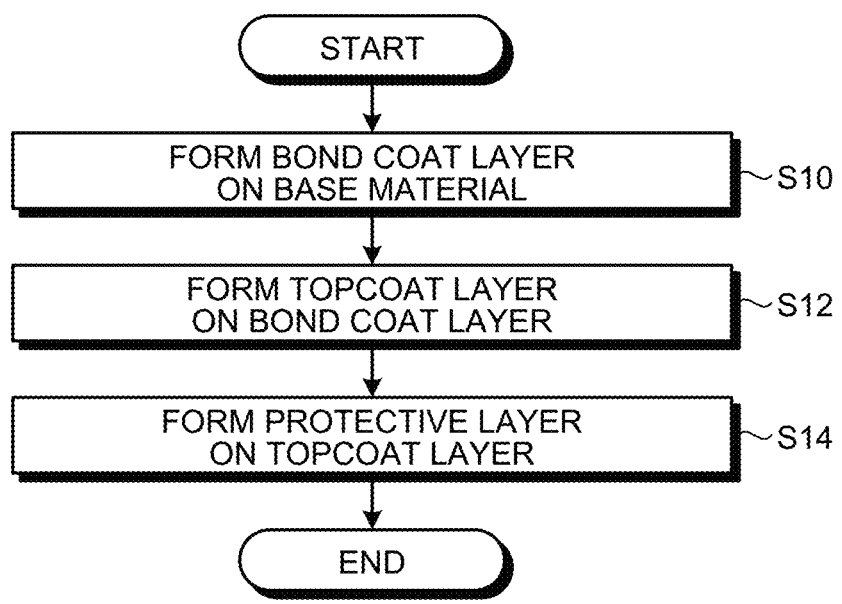
FIG. 3 is a flowchart explaining steps for forming the thermal barrier coating film according to the first embodiment.

The thermal barrier coating film 40 has a layered structure as described above. Next, steps for forming the thermal barrier coating film 40 are described with reference to a flowchart. FIG. 3 is a flowchart explaining the steps for forming the thermal barrier coating film according to the first embodiment. As illustrated in FIG. 3, the steps for forming the thermal barrier coating film 40 start with forming the bond coat layer 50 on the base material 110 of the turbine member 100 (Step S10; a bond coat layer forming step). At the bond coat layer forming step, the bond coat layer 50 is formed on the surface 112 of the base material 110, for example, by LPPS as described above. The steps for forming thermal barrier coating film 40 then moves on to forming the topcoat layer 60 on the bond coat layer 50 (Step S12; a topcoat layer forming step) At the topcoat layer forming step, the topcoat layer 60 is formed as a film on the surface 52 of the bond coat layer 50, for example, by APS as described above. The steps for forming the thermal barrier coating film 40 then moves on to forming the protective layer 70 on the topcoat layer 60 (Step S14; a protective layer forming step). At the protective layer forming step, the protective layer 70 is formed on the topcoat layer 60, for example, by APS with $SrSO_4$ particles used as a thermal spray material as described above. This step completes the steps for forming the thermal barrier coating film 40 that has the protective layer 70, which is a $SrSO_4$ film, in the outermost surface thereof.

In some cases, liquid fuel such as heavy oil is used as fuel for driving the gas turbine 10 to which the thermal barrier coating film 40 is applied. Liquid fuel such as heavy oil contains sodium, a sulfur component, and the like and, when the gas turbine 10 is driven, may generate sulfate that contains sodium sulfate or the like. This sulfate liquefies in a high-temperature environment with the gas turbine 10 being driven. In a case where the topcoat layer 60 is exposed to the outermost surface of the turbine member 100, there arises the risk that the thus liquefied sulfate penetrates into the topcoat layer 60 through the pores P in the topcoat layer 60. With sulfate having penetrated into the topcoat layer 60, development of cracks is accelerated therein, which makes the topcoat layer 60 more likely to separate from the base material 110 in an early stage.

With regard to a phenomenon of this kind, the inventors of the present invention have found that $SrSO_4$ has the effect of preventing sulfate such as sodium sulfate from penetrating. That is, the inventors of the present invention have found that $SrSO_4$ has low wettability to molten sulfate such as sodium sulfate. The thermal barrier coating film 40 according to the first embodiment covers a surface of the topcoat layer 60 with the protective layer 70 formed of $SrSO_4$, thereby preventing sulfate from penetrating into the protective layer 70 and thus being made capable of preventing sulfate from penetrating into the topcoat layer 60, which is arranged further inside than the protective layer 70. Consequently, the thermal barrier coating film 40 according to the first embodiment is capable of preventing sulfate from penetrating into the topcoat layer 60 and preventing itself from separating from the base material 110 in a sulfate-containing environment. Here, $SrSO_4$ is supposed to have a melting point of about 1600 degrees Celsius. That is, $SrSO_4$ has a higher melting point than other sulfate such as sodium sulfate (supposed to have a melting point of about 880 degrees Celsius). Therefore, even under a high temperature such that sulfate liquefies, the protective layer 70 keeps its solid state and can appropriately prevent penetration of sulfate.

Figure 4:
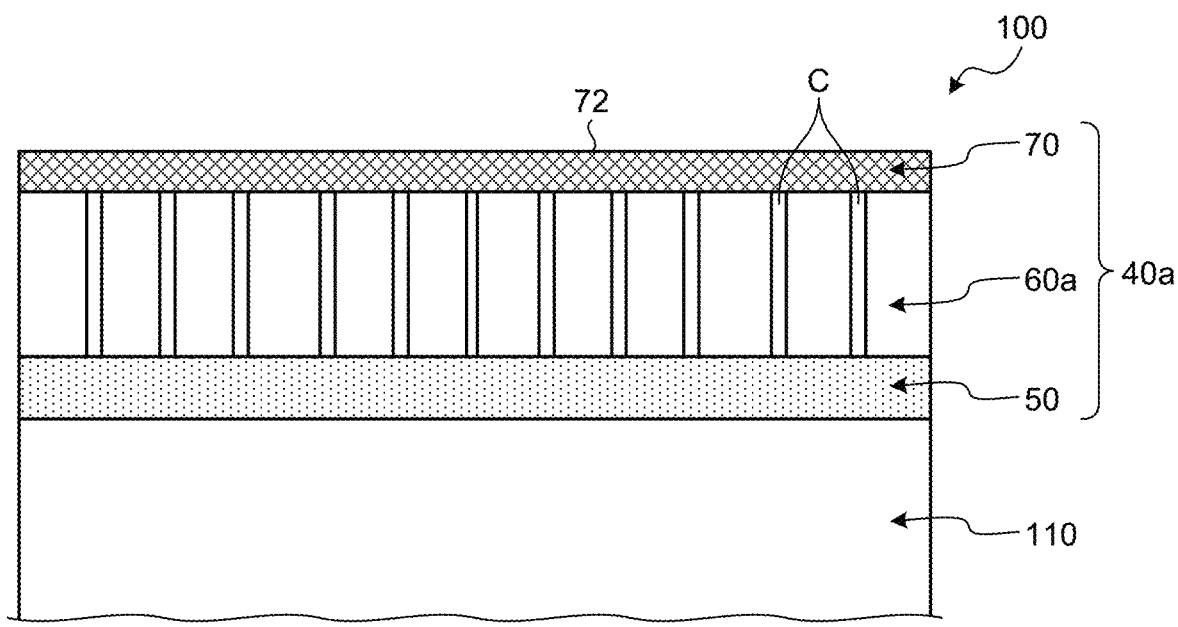
FIG. 4 is a schematic sectional view of another example of the thermal barrier coating film according to the first embodiment.

FIG. 4 is a schematic sectional view of another example of the thermal barrier coating film according to the first embodiment. The topcoat layer 60 has been described above as a porous film having the pores P as the void spaces. However, the topcoat layer may be a dense vertically cracked coat layer. That is, as illustrated in FIG. 4, a thermal barrier coating film 40a may be formed on the base material 110. The thermal barrier coating film 40a includes a topcoat layer 60a in place of the porous topcoat layer 60. The topcoat layer 60a is a dense vertically cracked coat layer. The topcoat layer 60a has a plurality of vertical cracks C as the void spaces. The vertical cracks C are dense cracks that extend in the depth (thickness) direction of the topcoat layer 60a. The topcoat layer 60a has followability of structural stress (distortion) because of the vertical cracks C, thereby being excellent in heat cycle durability. In addition, the topcoat layer 60a has a dense structure, thereby being excellent in erosion resistance. The topcoat layer 60a is formed of the same material as the topcoat layer 60. The thermal barrier coating film 40a has the surface of the topcoat layer 60a coated with the protective layer 70, thus being likewise capable of preventing sulfate such as sodium sulfate from penetrating.

As described above, the thermal barrier coating film 40 according to the first embodiment includes the bond coat layer 50, the topcoat layer 60, and the protective layer 70. The bond coat layer 50 is a metallic bond layer formed on the base material 110. The topcoat layer 60 is a ceramic-containing layer formed on the bond coat layer 50. The protective layer 70 is a layer formed on the topcoat layer 60 and mainly containing $SrSO_4$. In the thermal barrier coating film 40, the protective layer 70 mainly containing $SrSO_4$ is disposed on the topcoat layer 60. $SrSO_4$ contained in the protective layer 70 enables this thermal barrier coating film 40 to prevent sulfate such as sodium sulfate from penetrating into the topcoat layer 60. The thermal barrier coating film 40 can thus prevent itself from separating from the base material 110 in a sulfate-containing environment.

The topcoat layer 60 has a plurality of void spaces. The thermal barrier coating film 40 is capable of not only exhibiting improved thermal barrier performance owing to the void spaces in the topcoat layer 60 but also favorably preventing, owing to the protective layer 70, sulfate from penetrating the void spaces in the topcoat layer 60.

The topcoat layer 60a included in the thermal barrier coating film 40a may alternatively be a dense vertically cracked coat layer. This thermal barrier coating film 40a is capable of not only preventing penetration of sulfate owing to the protective layer 70 but also exhibiting improved heat cycle durability and improved erosion resistance owing to the topcoat layer 60a that is a dense vertically cracked coat layer.

The protective layer 70 preferably has a porosity of 0.1% to 5% by volume. The thermal barrier coating film 40 according to the first embodiment has the protective layer 70 provided with low porosity, thereby being capable of more suitably preventing sulfate from penetrating.

Second Embodiment

A second embodiment is described next. A thermal barrier coating film 40A according to the second embodiment is different from the first embodiment in that it includes a protective substance 70A in a topcoat layer 60A instead of including the protective layer 70, the protective substance 70A mainly containing $SrSO_4$. In the second embodiment, descriptions on parts that are also included in the first embodiment are omitted.

Figure 5:
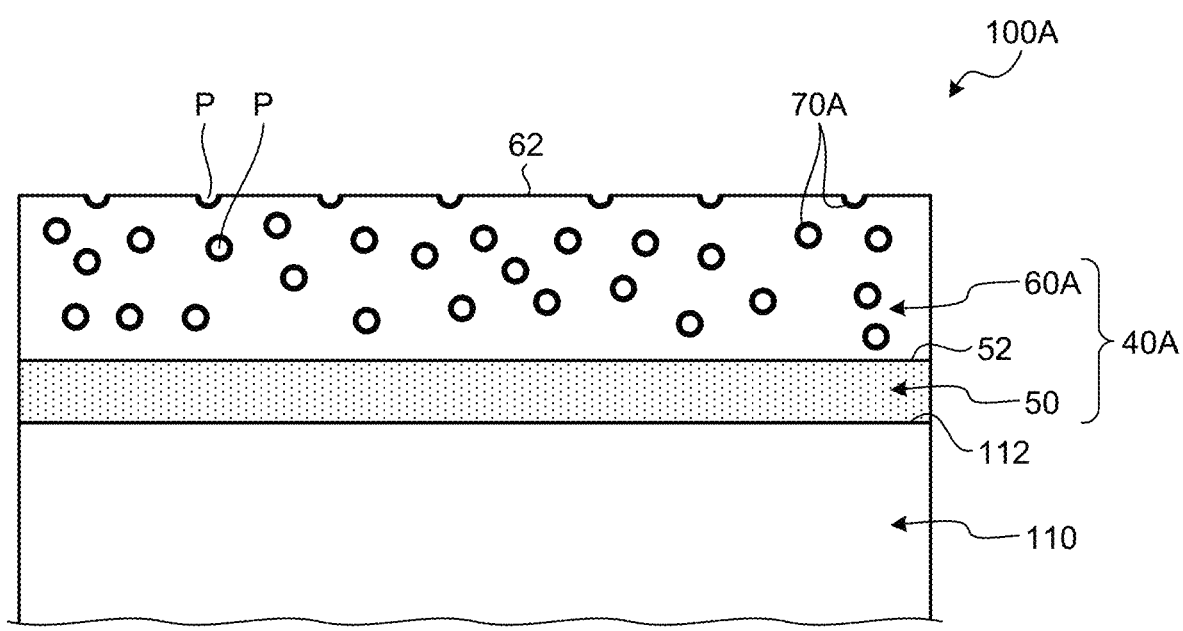
FIG. 5 is a schematic sectional view of a thermal barrier coating film according to a second embodiment.

FIG. 5 is a schematic sectional view of the thermal barrier coating film according to the second embodiment. As illustrated in FIG. 5, a turbine member 100A according to the second embodiment has the thermal barrier coating film 40A disposed on the base material 110. The thermal barrier coating film 40A includes the bond coat layer 50 and the topcoat layer 60A.

The topcoat layer 60A is formed on the surface 52 of the bond coat layer 50 using the same material and the same process as those used in forming the topcoat layer 60 according to the first embodiment. However, the topcoat layer 60A is exposed to the outermost surface of the turbine member 100A unlike the corresponding component in the first embodiment.

The protective substance 70A is disposed in void spaces in the interior of the topcoat layer 60A, which are the pores P herein. The protective substance 70A is $SrSO_4$ but may contain another component or other components insofar as it mainly contains $SrSO_4$. The protective substance 70A adheres in a film-like fashion onto an inner circumference of each of the pores P. However, the protective substance 70A needs only to be disposed in the interior of the pores P and is not limited to being adhering in a film-like fashion.

The protective substance 70A is injected into each of the pores P (void spaces) in the topcoat layer 60A. Specifically, an impregnation process is performed in which the pores P in the topcoat layer 60A are impregnated with liquid containing $SrSO_4$ particles, and a liquid component is removed from the liquid, thereby obtaining solid $SrSO_4$ remaining as the protective substance 70A in the interior of the pore P. As an example of the impregnation process, a suspension containing $SrSO_4$ particles sized at 1 µm or less is sprayed to the surface 62 of the topcoat layer 60A. Alternatively, the turbine member 100 having the topcoat layer 60A formed thereon as a film may be soaked in this suspension. The process impregnates the pores P with the suspension. Thereafter, water in the suspension is evaporated by, for example, drying or heating, so that $SrSO_4$ particles remain in the interior of the pores P as the protective substance 70A and adhere to the inner circumferences of the pores P. This completes the impregnation process. It is preferable that a polycarboxylic acid be used as a surfactant for the suspension. In producing this suspension, for example, $SrSO_4$ powder, water, and a surfactant are blended so that the mass ratio of the respective ingredients can be 2.5:2:0.02, and are mixed together with a ball mill.

As described above, $SrSO_4$ prevents penetration of sulfate such as sodium sulfate. Therefore, the protective substance 70A disposed in the interior of the pores P of the topcoat layer 60A can prevent sulfate from penetrating further inward beyond the topcoat layer 60A. Thus, the thermal barrier coating film 40A according to the second embodiment is capable of preventing sulfate from penetrating into the topcoat layer 60 and consequently preventing itself from separating from the base material 110 in a sulfate-containing environment.

Figure 6:
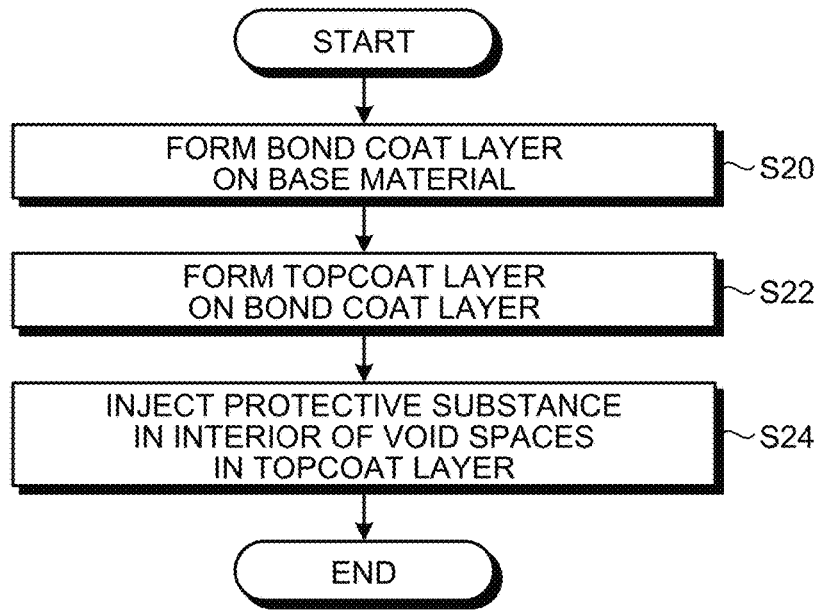
FIG. 6 is a flowchart explaining steps for forming the thermal barrier coating film according to the second embodiment.

The thermal barrier coating film 40A has a layered structure as described above. Next, steps for forming the thermal barrier coating film 40A are described with reference to a flowchart. FIG. 6 is a flowchart explaining the steps for forming the thermal barrier coating film according to the second embodiment. As illustrated in FIG. 6, the steps for forming the thermal barrier coating film 40A start with forming the bond coat layer 50 on the base material 110 of the turbine member 100A (Step S20; a bond coat layer forming step). The bond coat layer forming step is the same as that in the first embodiment. The steps for forming thermal barrier coating film 40A then moves on to forming the topcoat layer 60A on the bond coat layer 50 (Step S22; a topcoat layer forming step). The topcoat layer forming step is the same as that in the first embodiment. The steps for forming the thermal barrier coating film 40A then moves on to injecting the protective substance 70A into the interior of the void spaces in the topcoat layer 60A (Step S24; a protective substance injecting step). A protective substance adhering step, as described above, causes the suspension containing $SrSO_4$ fine particles to penetrate (be injected) into the interior of the pores P and removes moisture in the suspension, thereby causing the $SrSO_4$ fine particles to remain as the protective substance 70A in the interior of the pores P. This step completes the steps for forming the thermal barrier coating film 40A.

Figure 7:
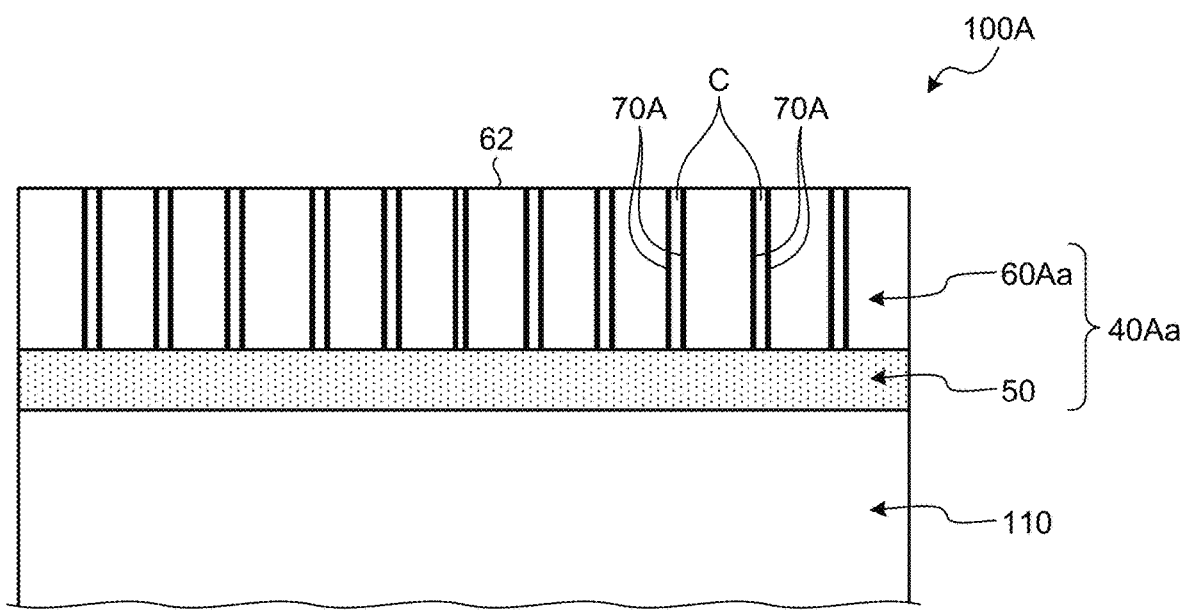
FIG. 7 is a schematic sectional view of another example of the thermal barrier coating film according to the second embodiment.

FIG. 7 is a schematic sectional view of another example of the thermal barrier coating film according to the second embodiment. The topcoat layer 60A has been described above as a porous film having the pores P as the void spaces. However, the topcoat layer may be a dense vertically cracked coat layer. That is, as illustrated in FIG. 7, a thermal barrier coating film 40Aa may be formed on the base material 110. The thermal barrier coating film 40Aa includes a topcoat layer 60Aa in place of the porous topcoat layer 60A. The topcoat layer 60Aa is a dense vertically cracked coat layer as with the topcoat layer 60a (see FIG. 4) according to the other example of the first embodiment. The topcoat layer 60Aa has the protective substance 70A disposed in the vertical cracks C serving as the void spaces. The protective substance injecting step causes the suspension containing $SrSO_4$ fine particles to penetrate (be injected) into the interior of the vertical cracks C and removes moisture in the suspension, thereby causing the $SrSO_4$ fine particles to remain as the protective substance 70A in the interior of the vertical cracks C. The thermal barrier coating film 40Aa has the protective substance 70A in the interior of the vertical cracks C serving as the void spaces, thereby being capable of preventing sulfate from penetrating further inward beyond the vertical cracks C and consequently preventing itself from separating from the base material 110.

As described above, the thermal barrier coating film 40A according to the second embodiment includes the bond coat layer 50 and the topcoat layer 60A. The bond coat layer 50 is a metallic bond layer formed on the base material 110. The topcoat layer 60A is a ceramic-containing layer formed on the bond coat layer 50 and having a plurality of void spaces. In the interior of the void spaces, the topcoat layer 60A has the protective substance 70A mainly containing $SrSO_4$. This thermal barrier coating film 40A has the protective substance 70A disposed in void spaces that constitute paths through which sulfate such as sodium sulfate penetrates. Thus, this thermal barrier coating film 40A prevents sulfate from penetrating further inward beyond the void spaces. Thus, the thermal barrier coating film 40A according to the second embodiment is capable of preventing sulfate from penetrating into the topcoat layer 60 and preventing itself from separating from the base material 110 in a sulfate-containing environment.

The topcoat layer 60Aa included in the thermal barrier coating film 40Aa is a dense vertically cracked coat layer and has the protective substance 70A disposed in the interior of cracks (vertical cracks C) in the dense vertically cracked coat layer. By having the protective substance 70A disposed in the cracks that constitute paths through which sulfate such as sodium sulfate penetrates, this thermal barrier coating film 40Aa prevents sulfate from penetrating into the topcoat layer 60. This thermal barrier coating film 40Aa is capable of not only preventing penetration of sulfate owing to the protective substance 70A but also exhibiting improved heat cycle durability and improved erosion resistance owing to the topcoat layer 60Aa that is a dense vertically cracked coat layer.

Example 1

Example 1 is described next. In Example 1, as an example of the protective layer 70 and the protective substance 70A, a sample was prepared by producing a powder compact of $SrSO_4$ and applying sodium sulfate powder on the surface of the powder compact of $SrSO_4$. In Example 1, other than this $SrSO_4$ sample, a plurality of comparative samples were prepared by producing respective powder compacts of $SiO_2$, platinum, $TiO_2$, $BaSO_4$, $Al_2O_3$, $Y_2O_3$, $Sc_2O_3$, mullite ($3Al_2O_3 \cdot 2SiO_2$), $CaSO_4$, and $Ta_2O_5$ and applying sodium sulfate powder to the surfaces of these powder compacts. In Example 1, this $SrSO_4$ sample and the comparative samples were heated at a temperature of 950 degrees Celsius for an hour, and it was observed whether sodium sulfate had penetrated into the powder compacts.

In Example 1, penetration of sodium sulfate powder into the power compacts was observed for all of the comparative samples. In Example 1, however, for the $SrSO_4$ sample, the sodium sulfate powder remained on the $SrSO_4$ powder compact after melting and then solidifying again, and penetration of sodium sulfate into the $SrSO_4$ powder compact was not observed. Thus, Example 1 indicates that $SrSO_4$ prevents sulfate such as sodium sulfate from penetrating.

Example 2

Figure 8:
FIG. 8 is a view illustrating a section of a sample in Example 2.

Example 2 is described next. FIG. 8 is a view illustrating a section of a sample in Example 2. In Example 2, a sample A was prepared by coating, with a protective layer 70B, a topcoat layer 60B formed by thermal spraying, and applying sodium sulfate powder S onto the protective layer 70B. This topcoat layer 60B is identical to the topcoat layer 60 in the first embodiment. While being formed of $SrSO_4$ as with the protective layer 70 in the first embodiment, the protective layer 70B was formed by use of silica sol, instead of by thermal spraying, so as to be applied as coating on the topcoat layer 60B.

In Example 2, this sample A was heated at a temperature of 950 degrees Celsius for an hour, and the sample A after the heating was cut for observation of a section thereof. FIG. 8 is a photograph of the section. As illustrated in FIG. 8, for the sample A, while the sodium sulfate powder S was melted and then solidified again, penetration thereof into the protective layer 70B and the topcoat layer 60B was not observed. Cracks occurred in the protective layer 70B, which are thought to have occurred because the molten salt used in the experiment was applied so much that high contraction stress was generated in the protective layer 70B during solidification and contraction of the molten salt. Even in that case, the thermal barrier coating layer underneath the protective layer 70B had neither molten salt having penetrated nor cracks generated therein, and $SrSO_4$ favorably exhibited protectiveness. Thus, Example 2 indicates that the protective layer 70B, that is, $SrSO_4$, prevents sulfate such as sodium sulfate from penetrating.

While the embodiments of the present invention have been described above, the descriptions of these embodiments are not intended to limit the embodiments. The constituent elements described above may include those that the skilled person can easily think of, those that are substantially identical, and those that fall within what is called the range of equivalence. Furthermore, the constituent elements described above can be combined as appropriate. Various omissions, substitutions, or modifications of the constituent elements can be made without departing from the spirit of the embodiments described above.

REFERENCE SIGNS LIST

1 Compressor
2 Combustor
3 Turbine
4 Turbine shaft
10 Gas turbine
11 Air intake
12 Compressor casing
13 Compressor vane
14 Compressor blade
21 Inner cylinder
22 Transition piece
23 External cylinder
24 Combustor casing
25 Air passage
31 Turbine casing
32 Turbine vane
33 Turbine blade
34a Exhaust gas diffuser
34 Exhaust gas chamber
40, 40a, 40A, 40Aa Thermal barrier coating film
41 Bearing part
42 Bearing part
50 Bond coat layer
52, 62, 72, 112 Surface
60, 60a, 60A, 60Aa, 60B Topcoat layer
70, 70B Protective layer
70A Protective substance
100, 100A Turbine member
110 Base material
A Sample
C Vertical crack
P Pore
R Shaft center
S Sodium sulfate powder

The invention claimed is:
1. A thermal barrier coating film comprising:
a bond coat layer that is a metallic bond layer formed on a base material;
a topcoat layer that is a ceramic-containing layer formed on the bond coat layer; and
at least one of a protective layer formed on the topcoat layer and mainly containing $SrSO_4$ and a protective substance provided in the interior of a plurality of void spaces included in the topcoat layer, the protective substance mainly containing $SrSO_4$.

2. The thermal barrier coating film according to claim 1, wherein the thermal barrier coating film includes the protective substance out of the protective layer and the protective substance.

3. The thermal barrier coating film according to claim 2, wherein the topcoat layer is a dense vertically cracked coat layer and has the protective substance in the interior of cracks in the dense vertically cracked coat layer.

4. A turbine member comprising the thermal barrier coating film according to claim 1 on a surface thereof.

5. A thermal barrier coating method for producing the thermal barrier coating film according to claim 1, comprising:
    forming, on a base material, a bond coat layer that is a metallic bond layer;
    forming, on the bond coat layer, a topcoat layer that is a ceramic-containing layer; and
    forming, on the topcoat layer, a protective layer that mainly contains $SrSO_4$.

6. A thermal barrier coating method for producing the thermal barrier coating film according to claim 1, comprising:
    forming, on a base material, a bond coat layer that is a metallic bond layer;
    forming, on the bond coat layer, a topcoat layer that is a ceramic-containing layer having a plurality of void spaces; and
    injecting, in the interior of the void spaces in the topcoat layer, a protective substance that mainly contains $SrSO_4$.

7. The thermal barrier coating film according to claim 1, wherein the thermal barrier coating film includes the protective layer out of the protective layer and the protective substance.

8. The thermal barrier coating film according to claim 7, wherein the topcoat layer has a plurality of void spaces.

9. The thermal barrier coating film according to claim 8, wherein the topcoat layer is a dense vertically cracked coat layer.

10. The thermal barrier coating film according to claim 7, wherein the protective layer has a porosity of 0.1% to 5%.

* * * * *